United States Patent
Solomon et al.

(10) Patent No.: US 8,176,207 B2
(45) Date of Patent: May 8, 2012

(54) SYSTEM DEBUG OF INPUT/OUTPUT VIRTUALIZATION DEVICE

(75) Inventors: Richard I. Solomon, Colorado Springs, CO (US); Jeffrey K. Whitt, Colorado Springs, CO (US); Eugene Saghi, Colorado Springs, CO (US); Garret Davey, Colorado Springs, CO (US)

(73) Assignee: LSI Corporation, Milpitas, CA (US)

( * ) Notice: Subject to any disclaimer, the term of this patent is extended or adjusted under 35 U.S.C. 154(b) by 418 days.

(21) Appl. No.: 12/079,371

(22) Filed: Mar. 26, 2008

(65) Prior Publication Data
US 2009/0248937 A1 Oct. 1, 2009

(51) Int. Cl.
*G06F 3/00* (2006.01)
*G06F 12/06* (2006.01)
(52) U.S. Cl. ........... 710/2; 710/8; 710/9; 710/10; 711/2; 711/202; 718/104
(58) Field of Classification Search .................. None
See application file for complete search history.

(56) References Cited

U.S. PATENT DOCUMENTS

| 5,608,876 | A | * | 3/1997 | Cohen et al. | 710/300 |
| 5,933,616 | A | * | 8/1999 | Pecone et al. | 710/240 |
| 6,128,718 | A | * | 10/2000 | Schmisseur et al. | 711/212 |

OTHER PUBLICATIONS

PCI-SIG, Single Root I/O Virtualization and Sharing Specification, Sep. 2007, Rev 1.0, pp. 1-84.*

* cited by examiner

*Primary Examiner* — Eron J Sorrell
*Assistant Examiner* — Dean Phan
(74) *Attorney, Agent, or Firm* — Suiter Swantz pc llo

(57) ABSTRACT

An adapter card for testing the functionality of a particular interface configuration may include an interface core. The interface core may comprise an electric circuit including electronic components and control logic for interfacing with an information handling system device. The adapter card may include a front end data channel coupled with the interface core for transmitting data between the electronic components and the information handling system device. The adapter card may include firmware for setting an indicator and causing the control logic to report a memory requirement to the information handling system device larger than a programmed memory space expected by the control logic.

10 Claims, 2 Drawing Sheets

SYSTEM DEBUG OF INPUT/OUTPUT VIRTUALIZATION DEVICE

TECHNICAL FIELD

The present disclosure generally relates to the field of adapter cards, and more particularly to an adapter card for connecting to an information handling system device for input/output virtualization.

BACKGROUND

An expansion card (also known as an expansion board, an adapter card, and an accessory card) may be connected to an information handling system device, such as a personal computer, for adding functionality to a computer system. Various interface formats may be utilized for interfacing with the information handling system device. One of these interface formats is the Peripheral Component Interconnect (PCI) Express interface. One particular PCI Express core may implement a configuration comprising Single Root Input/Output Virtualization (SR-IOV). Current computing systems may be capable of validating access to configuration registers. However, such systems may not be capable of testing the actual functionality of a particular configuration.

SUMMARY

An adapter card for interfacing with an information handling system device to test the functionality of a particular interface configuration may include an interface core for connecting to a component of the information handling system device. The interface core may comprise an electric circuit including electronic components and control logic for interfacing with the information handling system device. The adapter card may include a front end data channel coupled with the interface core for connecting the electric circuit to the component and transmitting data between the electronic components and the information handling system device. The adapter card may include firmware for setting an indicator and causing the control logic to report a memory requirement to the information handling system device larger than a programmed memory space expected by the control logic.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

Figure 1:
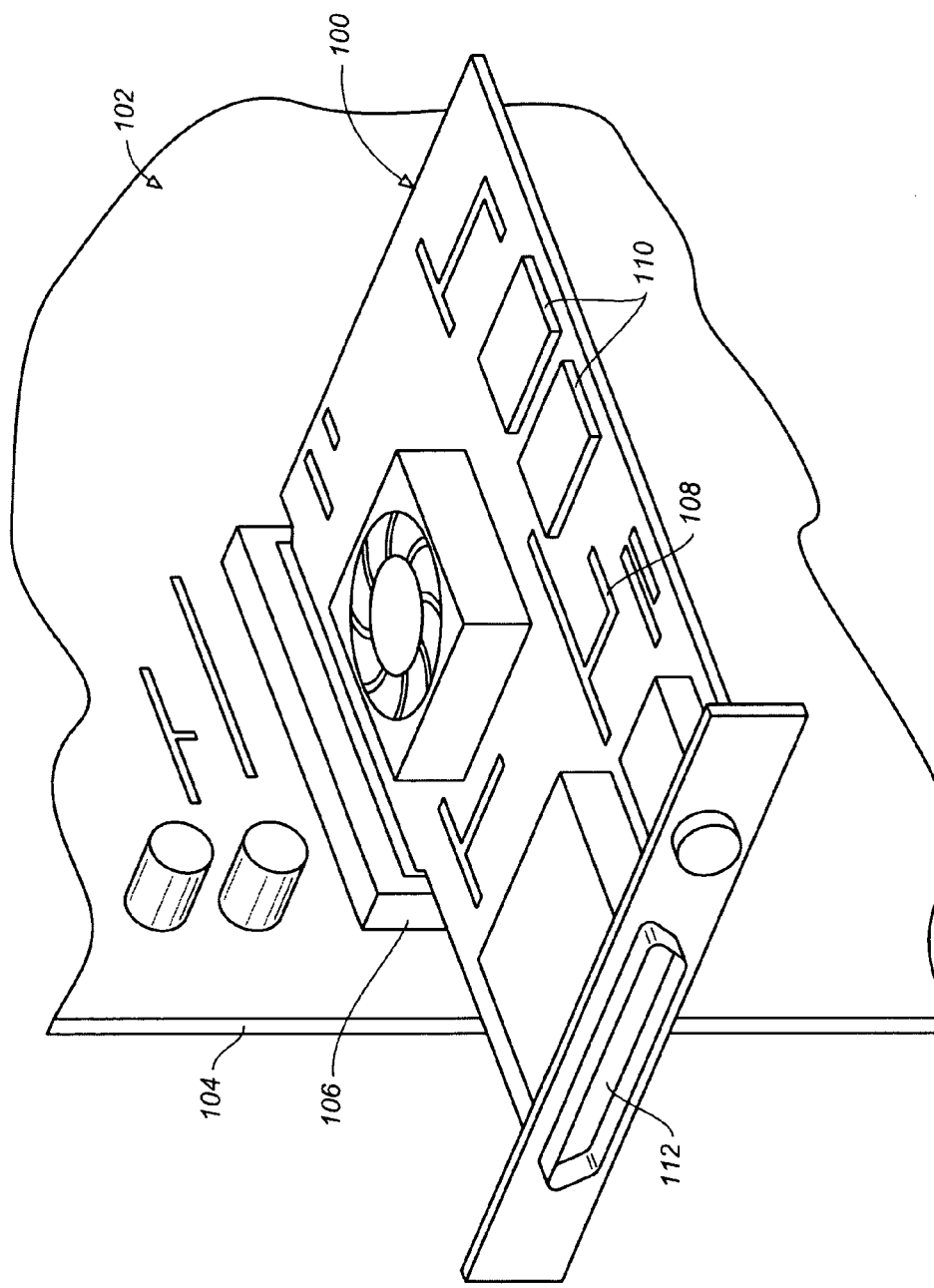
FIG. 1 is a partial isometric view illustrating an adapter card connected to an information handling system device.
Figure 2:
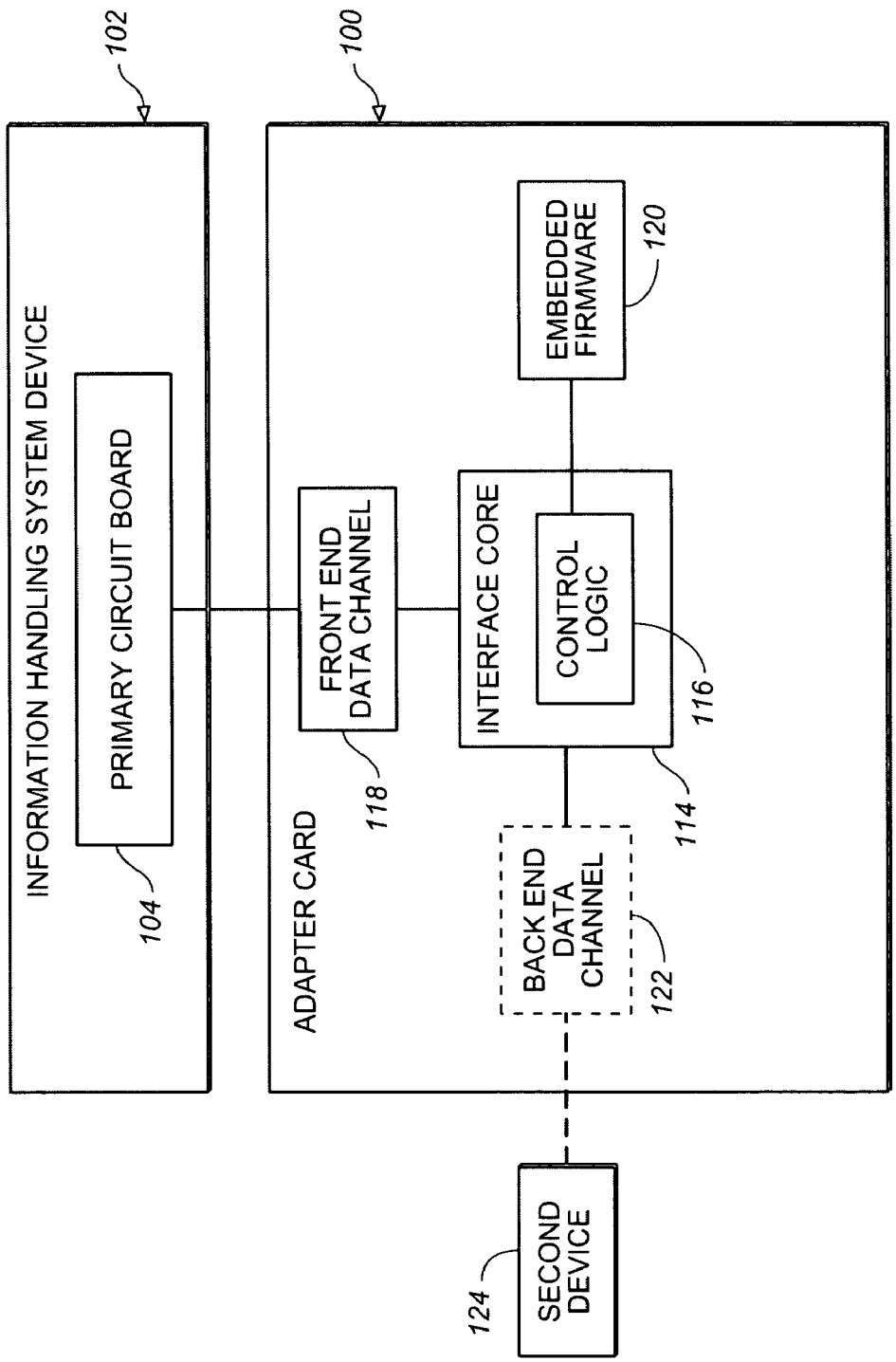
FIG. 2 is a block diagram illustrating a system for interfacing with an information handling system device.

Referring now to FIGS. 1 through 2, an adapter card 100 for interfacing with an information handling system device 102 is described in accordance with embodiments of the present invention. The adapter card 100 may comprise an expansion card, an expansion board, an accessory card, as well as a variety of other devices for interfacing with the information handling system device 102. The information handling system device 102 may comprise any type of electronic device having the ability to store, retrieve, and/or process data (e.g., a desktop computer, a laptop computer, and/or a server). The information handling system device 102 may include a primary circuit board 104 where calculations are performed for completing tasks assigned to the information handling system device 102.

In an implementation where the information handling system device 102 comprises a desktop PC, the primary circuit board 104 may include a mainboard/motherboard (e.g., a printed circuit board including a Central Processing Unit (CPU), one or more buses, memory sockets, and/or expansion slots). In one embodiment, the adapter card 100 may be connected to a component of the information handling system device (e.g., the primary circuit board 104) via an expansion slot 106. In other embodiments, the adapter card 100 may be connected to a component of the information handling system device via a direct/soldered connection, while in still further embodiments, the adapter card 100 may be wirelessly connected to a component of the information handling system device.

The adapter card 100 comprises an electric circuit 108 including one or more electronic components 110. For example, the adapter card 100 may include a printed circuit board having an electric circuit 108 utilizing conductive pathways (traces) etched from copper sheets and laminated onto a non-conductive substrate. The traces may be connected to the electronic components 110, including processing units, memory, specialized microchips, fans, input/output ports, and the like. In some embodiments, the adapter card 100 may add functionality to the information handling system device 102. For example, the adapter card 100 may include a port 112 for connecting an external device (e.g., a printer, a monitor, an external disk drive) to the information handling system device 102. In this configuration, the adapter card 100 may be utilized for controlling data exchanged between the external device and the information handling system device 102.

The electric circuit 108 and one or more of the electronic components 110 may generally form an interface core 114 including control logic 116 for interfacing with the information handling system device 102. It will be appreciated that the interface core 114 and/or the control logic 116 may be configured to interface with the information handling system device 102 according to a variety of standards. In one specific instance, the interface core 114 may implement the Peripheral Component Interconnect (PCI) Express interface format. In other embodiments, the interface core 114 may implement other interface formats/standards.

The adapter card 100 includes a front end data channel 118 coupled with the interface core 114 for connecting the electric circuit 108 to the primary circuit board 104. For example, the adapter card 100 may include a front end data channel 118 accessible via connectors provided on the substrate of the adapter card 100 and accessible via the expansion slot 106 of the primary circuit board 104. The front end data channel 118 may be utilized for transmitting data (e.g., in the form of data packets) between the electronic components 110 and the information handling system device 102. For instance, data may be transmitted from an external device to the information handling system device 102 via a pathway including an input/ output port, such as port 112. In another instance, data may be transmitted from a specialized microchip included with the adapter card 100 to the information handling system device 102. The front end data channel 118 may comprise a PCI Express interface as previously described.

The adapter card 100 may include firmware 120 coupled with the control logic 116 of the interface core 114. The firmware 120 sets an indicator such as a control bit (e.g., a DebugControl bit) before the information handling system device 102 allocates memory resources to the interface core 114. In a specific instance, the indicator is set when power is supplied to the electric circuit 108. For example, in one specific embodiment, a DebugControl bit is set at power up via embedded firmware 120. The control bit set by the firmware 120 causes the control logic 116 to report a memory requirement to the information handling system device 102 larger than a programmed memory space expected by the control logic 116. For instance, in one embodiment utilizing PCI Express core logic, a DebugControl bit may cause the core logic to report a 16 megabyte (MB) core memory requirement at the Base Address Register. Meanwhile, the rest of the core logic continues to assume that the programmed memory space is smaller than the 16 MB reported (e.g., 64 kilobytes (KB) in one specific instance). The control bit set by the firmware 120 may be cleared by software executable by the information handling system device 102 after the information handling system device 102 is booted. For example, the DebugControl bit may be cleared after booting the information handling system device 102 by dedicated SR-IOV test software. It will be appreciated that the control bit may be set and/or cleared by a number of different techniques other than utilizing the firmware 120, including the utilization of hardware, software, and or dedicated electronic circuits. Further the control bit may be set and/or cleared by either or both of the adapter card 100 and the information handling system device 102.

After a memory region has been allocated by the information handling system device 102 based upon the memory requirement reported by the embedded firmware 120, one or more programmed Single Root Input/Output Virtualization (SR-IOV) features may reside in the allocated memory region. For example, a manually programmed SR-IOV feature may reside in a portion of the memory region allocated by the information handling system device 102 which is not part of the programmed memory space expected by the control logic 116. Continuing the previous example utilizing PCI Express core logic, once the DebugControl bit is cleared, the PCI Express core will be decoding the small (64 KB) region, but the information handling system device 102 will have allocated and routed the large (16 MB) region to the PCI Express port. In this manner, dedicated SR-IOV test software may program one or more SR-IOV Virtual Functions to reside in the "unused" portion of the large memory region (e.g., that portion which does not comprise the small memory region). Then, access to the Virtual Functions may be tested.

The adapter card 100 may include a back end data channel 122 coupled with the interface core 114 for connecting the electric circuit 108 to a second device 124 (e.g., a printer, a monitor, an external disk drive). For example, the adapter card 100 may include a back end data channel 122 accessible via the port 112. The back end data channel 122 may be utilized for transmitting data between the second device 124 and the information handling system device 102. For instance, data may be transmitted from the second device 124 to the information handling system device 102 via a pathway including the port 112, the back end data channel 122, and the front end data channel 118. In another instance, data may be transmitted from a specialized microchip included with the adapter card 100 to the second device 124. The back end data channel 122 may comprise a Small Computer System Interface (SCSI), a Serial Attached SCSI (SAS), a Fibre Channel, or another interface as desired.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A system, comprising:
   an interface core configured to connect a component of an information handling system device, the interface core comprising an electric circuit including one or more electronic components and control logic to interface with the information handling system device;
   a front end data channel coupled with the interface core configured to connect the electric circuit to the component and to transmit data between the one or more electronic components and the information handling system device;
   firmware configured to set an indicator before memory is allocated to the interface core, wherein the indicator is set by the firmware when the system is powered up to cause the control logic to report a memory requirement to the information handling system device larger than a programmed memory space expected by the control logic to decode by the control logic, and the indicator is cleared by software executed by the information handling system device after the information handling system device is booted; and
   a Single Root Input/Output Virtualization (SR-IOV) feature resident in a memory region allocated by the information handling system device based on the memory requirement reported by the control logic configured to test access to the SR-IOV feature,
   wherein the SR-IOV feature comprises an SR-IOV Virtual Function which is programmed to reside in a portion of the memory region that is not part of the programmed memory space expected by the control logic once the indicator is cleared by software.

2. The system of claim 1, wherein the front end data channel comprises a Peripheral Component Interconnect (PCI) Express interface.

3. The system of claim 1, further comprising a back end data channel coupled with the interface core for connecting the electric circuit to a second device and transmitting data between the second device and the information handling system device.

4. The system of claim 3, wherein the back end data channel comprises at least one of a Small Computer System Interface (SCSI), a Serial Attached SCSI (SAS), or a Fibre Channel.

5. The system of claim 1, wherein the memory region allocated by the information handling system device based on the larger memory requirement reported by the control logic is routed to the front end data channel.

6. The system of claim 1, wherein the indicator is a DebugControl bit.

7. A system, comprising:
   an interface core configured to connect a component of an information handling system device, the interface core comprising an electric circuit including one or more electronic components and control logic to interface with the information handling system device;

a front end data channel coupled with the interface core configured to connect the electric circuit to the component and to transmit data between the one or more electronic components and the information handling system device;

at least one of a hardware component, a software unit, or a dedicated electronic circuit configured to set an indicator before memory is allocated to the interface core, wherein the indicator is set by the setting means when the system is powered up to cause the control logic to report a memory requirement to the information handling system device larger than a programmed memory space expected by the control logic to decode by the control logic, and the indicator is cleared by software executed by the information handling system device after the information handling system device is booted; and a Single Root Input/Output Virtualization (SR-IOV) feature resident in a memory region allocated by the information handling system device based on the larger memory requirement reported by the control logic configured to test access to the SR-IOV feature, wherein the SR-IOV feature comprises an SR-IOV Virtual Function which is programmed to reside in a portion of the memory region that is not part of the programmed memory space expected by the control logic once the indicator is cleared by software.

8. The system of claim 7, wherein the front end data channel comprises a Peripheral Component Interconnect (PCI) Express interface.

9. The system of claim 7, further comprising a back end data channel coupled with the interface core for connecting the electric circuit to a second device and transmitting data between the second device and the information handling system device.

10. The system of claim 9, wherein the back end data channel comprises at least one of a Small Computer System Interface (SCSI), a Serial Attached SCSI (SAS), or a Fibre Channel.

* * * * *